(12) United States Patent
Suvernev (10) Patent No.: US 9,639,270 B2
(45) Date of Patent: May 2, 2017

(54) DOUBLE-LINKED LISTS WITH REFERENCE COUNTERS

(71) Applicant: SAP SE, Walldorf (DE)

(72) Inventor: Andrei Suvernev, Palo Alto, CA (US)

(73) Assignee: SAP SE, Walldorf (DE)

( * ) Notice: Subject to any disclaimer, the term of this patent is extended or adjusted under 35 U.S.C. 154(b) by 114 days.

(21) Appl. No.: 14/741,231

(22) Filed: Jun. 16, 2015

(65) Prior Publication Data

US 2016/0371003 A1    Dec. 22, 2016

(51) Int. Cl.
*G06F 12/16* (2006.01)
*G06F 3/06* (2006.01)

(52) U.S. Cl.
CPC ............ *G06F 3/0604* (2013.01); *G06F 3/065* (2013.01); *G06F 3/0671* (2013.01)

(58) Field of Classification Search
None
See application file for complete search history.

(56) References Cited

PUBLICATIONS

Timothy L. Harris, "A Pragmatic Implementation of Non-Blocking Linked-Lists", Proceeding DISC '01 Proceedings of the 15th International Conference on Distributed Computing pp. 300314, Oct. 2001.*
Asghar, Sarmad "A Lock Free Doubly Linked List—CodeProject", Feb. 12, 2014, (pp. 1-16, 16 total pages).
Valois, John D. "Lock-Free Linked Lists Using Compare-and-Swap", 1995, DOI: 10.1145/224964.224988, 9pgs.
Sundell, Hakan et al., "Lock-Free and Practical Deques using Single-Word Compare-And-Swap", Technical Report No. 2004-02, Goteborg, Sweden, 2004, ISSN: 1650-3023, 17pgs.

\* cited by examiner

*Primary Examiner* — Duc Doan
(74) *Attorney, Agent, or Firm* — Buckley, Maschoff & Talwalkar LLC (57) ABSTRACT

A system includes, in a first memory location, a pointer to a next one of the plurality of memory locations and a respective reference counter, in each of respective ones of a plurality of memory locations, a pointer to a next one of the plurality of memory locations, a pointer to a previous one of the plurality of memory locations, and a reference counter, and in a last memory location, a pointer to a previous one of the plurality of memory locations and a respective reference counter, and atomically incrementing and decrementing of a reference counter stored in one of the plurality of memory locations.

18 Claims, 7 Drawing Sheets

DOUBLE-LINKED LISTS WITH REFERENCE COUNTERS

BACKGROUND

A double-linked list is a list of items, where each of the items is stored somewhere in a computer memory system. Each item includes a Next pointer to a storage location of a next item in the list, and a Prey pointer to a storage location of a previous item in the list. These two pointers allow traversal of the list in either direction. In a multi-threaded environment, insertion and deletion of list items are most-commonly implemented using locking techniques such as mutual exclusion, which suffer from deadlocks and priority inversion.

Lock-free techniques improve concurrency and scalability by addressing potential issues such as race conditions and deadlocks. Some conventional lock-free techniques manipulate items within double-linked lists by using the compare-and-swap atomic primitive. These techniques are useful if the lists are accessed only via their head or tail nodes. However, these techniques are insufficient if each node in a list is treated as an independent object with any number of possible handles in concurrent threads.

DESCRIPTION

The following description is provided to enable any person in the art to make and use the described embodiments. Various modifications, however, will remain readily apparent to those in the art.

Generally, some embodiments provide lock-free lists composed of one or more items (hereinafter referred to as nodes), in which each node includes a reference counter. Implementation of such a list may be utilized in various resource-critical contexts, in which locking and/or memory allocation is not desirable.

In one example, a list according to some embodiments may be used to implement C++ exception objects. C++ exception objects describe special conditions (e.g., errors or abnormalities) that change the normal flow of program execution. During program execution, an exception is "thrown" when some programmer-specified error or abnormal condition is detected. This causes the normal program flow to be aborted, and passes a C++ exception object to a designated block of code, called a catch block. The exception object may provide data that is necessary for the catch block to determine how to handle the exception.

While an exception is being handled, another exception may be thrown, resulting in creation of another exception object. It is desirable to concatenate all such pending exception objects into a single linked list and process the list using a penultimate exception handler. It is also desirable to store recent exception objects within the context of the throwing execution thread for diagnostics and statistics tracking. Accordingly, support for concurrent access to exceptions from different threads is desired.

Figure 1:
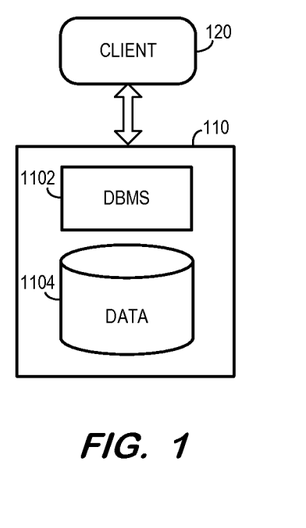
FIG. 1 is a block diagram of a system architecture according to some embodiments.

FIG. 1 is a block diagram of a system architecture according to some embodiments. FIG. 1 represents a logical architecture for describing systems according to some embodiments, and actual implementations may include more or different components arranged in other manners. Embodiments are not limited to use in architectures such as that illustrated in FIG. 1.

FIG. 1 illustrates database system 110 and client 120. Database system 110 may comprise a computing system providing one or more microprocessors, processor cores and/or execution threads. Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Data 1104 of database 110 may be distributed among several relational databases, multi-dimensional databases, and/or other data sources. Embodiments are not limited to any number or types of data sources. For example, database 110 may comprise one or more OnLine Analytical Processing (OLAP) databases (i.e., cubes), spreadsheets, text documents, presentations, etc.

Database 110 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Data 1104 of database 110 may comprise one or more of conventional tabular data, row-based data stored in row format, column-based data stored in columnar format, and object-based data. Database 110 may also or alternatively support multi-tenancy by providing multiple logical database systems which are programmatically isolated from one another. Moreover, data 1104 may be indexed and/or selectively replicated in an index to allow fast searching and retrieval thereof.

Database management system 1102 serves requests to retrieve and/or modify data 1104, and also performs administrative and management functions for database 110. Such functions may include snapshot and backup management, indexing, optimization, garbage collection, and/or any other database functions that are or become known.

Database client 120 may comprise one or more computing devices executing program code of a software application for presenting user interfaces to allow interaction with database system 110. For example, a user may manipulate such user interfaces to request particular data (e.g., for populating a spreadsheet, a graph, etc.). In response, client 120 executes program code of a software application to generate a query (e.g., a structured query language (SQL) query) identifying the requested data, and to transmit the query to database management system 1102.

Database system 110 provides functionality by executing runtime program code of database management system 1102 and of database applications (not shown). This program code may, according to some embodiments, implement C++ exception objects using double-linked lists as described herein.

Figure 2:
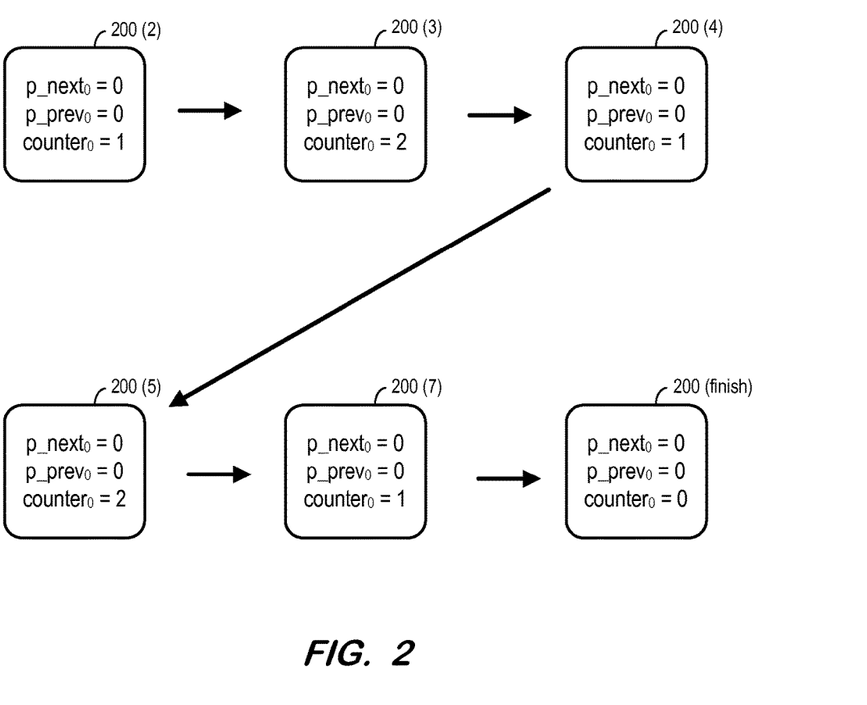
FIG. 2 is a diagram illustrating state transitions of a list node according to some embodiments.

FIG. 2 illustrates changes to a list node during execution of program code according to some embodiments, and based on the following example code for exception processing:

try { (1)
exception a; (2)
throw a; (3)
} (4)
catch(exception b) (5)
{ (6)
} (7)

Code line (2) creates an exception object (e.g., exception object A) and, as a result, node 200 (2) of FIG. 2 is created to represent exception object A. In order to create node 200 (2), memory for the node is allocated and the data members are initialized. For example, $counter_0$ of node 200 (2) is set to 1, $p\_next_0$ is set to 0, and $p\_prev_0$ is set to 0. Node 200 (2) may also include information relating to the circumstances of the exception. This information may include an error code, a short description of the associated problem as well as source code location, call backtrace and/or runtime information (e.g., index value in the case of an out-of-range access exception).

Next, at line (3), the runtime compiler copies exception object A to the thread local storage (TLS). Consequently, $counter_0$ (of node 200 (FIG. 2)) is incremented as shown by node 200 (3). At line (4), exception object A goes out of scope (e.g., a programmer-specified error or abnormal condition is detected) and $counter_0$ of node 200 is decremented to 1. (as shown by node 200 (4)) A new copy exception object B of the exception object is created by the catch expression at line (5), causing $counter_0$ to be incremented as shown by node 200 (5). Next, exception object B goes out of scope at line (7) and the $counter_0$ of node 200 (7) is decremented to 1. Exception handling is then finished, the runtime destroys its exception copy, the counter is decremented and becomes zero, and associated memory is recycled.

The above-described process includes a copy operation which results in incrementing a counter of a corresponding node. In order to support lock-free operation, an atomic operation is used to increment the counter, regardless of the values of the other fields of the node. An atomic operation is a sequence of one or more machine instructions that are executed sequentially, without interruption.

According to some embodiments, the underlying hardware of database 110 supports compare-and-swap (cas) atomic operations on 128 bit numbers. Moreover, each node's reference counter and p_prev are combined into an atomic structure, referred to herein as the pointer-counter combination.

The following is an example, in C++, of an atomic operation to increment the reference counter regardless of the value of p_prev, where "pc_" is a node member of type pointer_counter_combination, containing p_prev and the reference counter:

```
void node::increment( ) volatile noexcept
{
    pointer_counter_combination<volatile node>old_val;
        old_val.set_non_atomic_from_atomic(pc_);
    pointer_counter_combination<volatile node>new_val
        (old_val.pointer( ), old_val.counter( )+1);
    while(!pc_.cas(old_val, new_val, old_val))
    {
        new_val.set(old_val.pointer( ), old_val.counter( )+1);
    }
}
```

Figure 3:
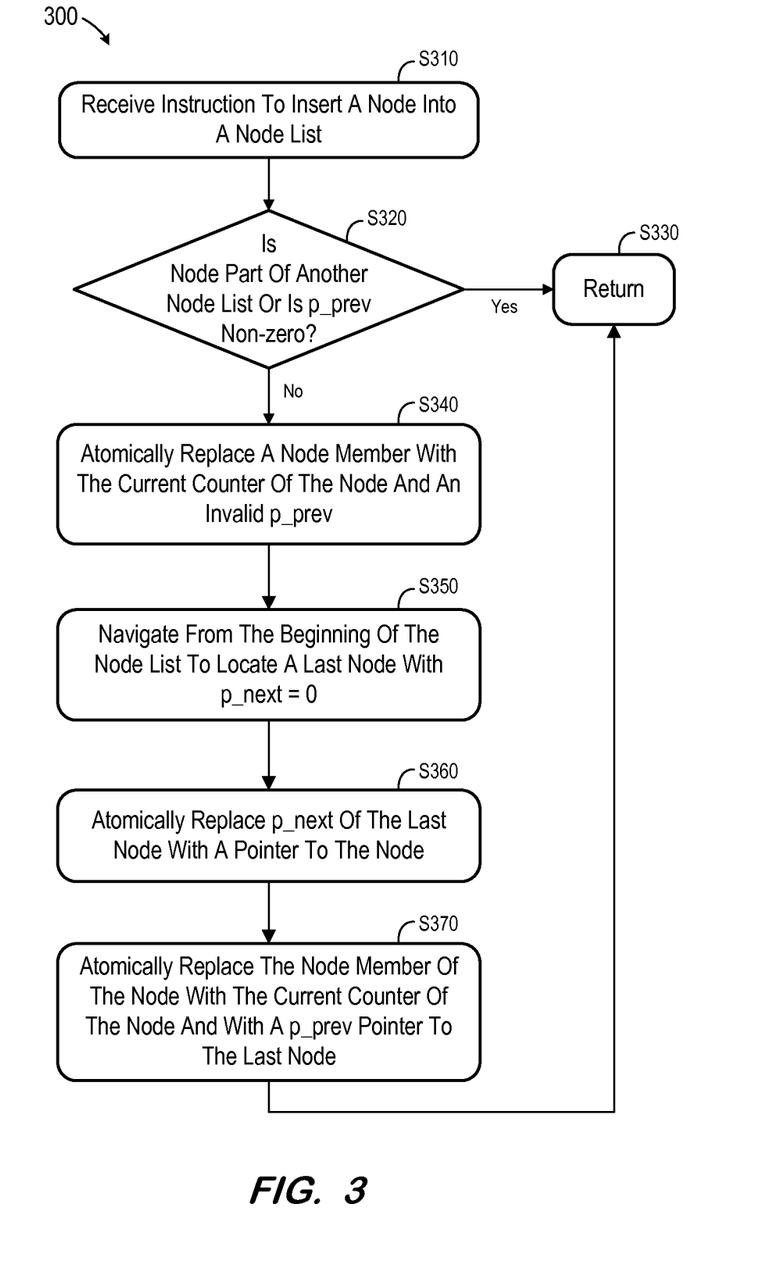
FIG. 3 is a flow diagram according to some embodiments.

FIG. 3 is a flow diagram of process 300 to insert a node into a linked list of one or more nodes according to some embodiments. Process 300 may be executed by one or more processing units of one or more computing devices. A processing unit may comprise a processor, a processor core, a processor thread, or the like. Multiple instances of process 300 may be executed in parallel by multiple processing units. Accordingly, some embodiments provide lock-free insertion of a node into a linked list of one or more nodes.

Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, an instruction is received to insert a node into a node list. According to the present example, the node represents a C++ exception. The instruction may be received at S310 within an exception handler, where exception processing generates another exception which require concatenation with a node resulting from throwing of the exception which was caught by the exception handler. According to some embodiments, the last ten exceptions in each thread are collected and stored in the thread local storage. If the system crashes, a special thread concatenates the exceptions from each thread and writes them into the crashdump file. As described above, embodiments are not limited to C++ exceptions.

At S320, it is determined whether the node is a member of another node list, or if p_prev of the node≠0. Flow continues to S330 to return to the requesting thread (with a fail or error indication) if either of these conditions are true. If the node is not a member of another node list and p_prev=0, flow proceeds to S340.

Figure 4:
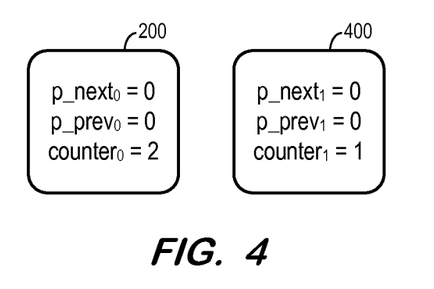
FIGS. 4-7 illustrate insertion of a node into a list according to some embodiments.

FIG. 4 illustrates node 400 to be inserted into a node list. For simplicity, the node list includes only one node, node 200. Node 400 is not a member of another node list, and $p\_prev_1=0$. Accordingly, based on node 400, it would be determined at S320 to proceed to S340.

Figure 5:
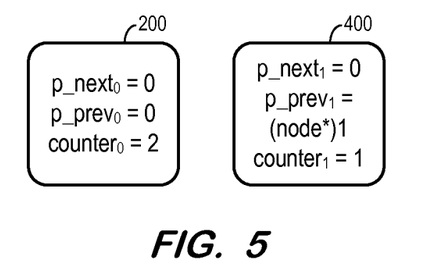

At S340, a node member is atomically replaced with the current count of the code and an invalid value of p_prev. The node member may be a single value of type pointer_counter_combination as described above and may include both the counter and the p_prev values. According to some embodiments, the compare-and-swap atomic operation is used to perform the replacement at S340. FIG. 5 illustrates node 400 after S340 according to some embodiments. The value (node*)1 represents the first page in the virtual address space 0-4 KB, which is not mapped to any physical memory and does not contain any valid address.

Next, at S350, the node list is navigated from its beginning, following the p_next pointers of each subsequent node, to locate a last node of the node list, in which p_next=0. In the example of FIG. 5, node 200 is both the first and the last node in the current node list. It should be noted that in a node list including more than one node, a last node would include a p_next value of zero.

Figure 6:
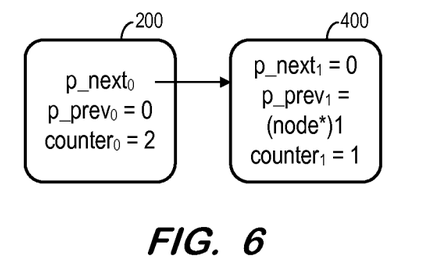

At S360, p_next of the last node located at S350 is atomically replaced with a pointer to the node to be inserted. This atomic replacement may proceed using a compare-andswap operation as described above. FIG. 6 illustrates replacement of p_next according to some embodiments of S360.

Figure 7:
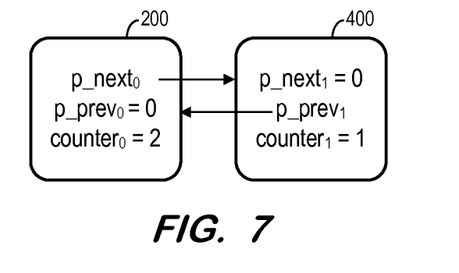

Then, at S370, the node member of type pointer_counter_combination of the node to be inserted is atomically replaced with the current count of the code and a p_prev pointing to the last node. FIG. 7 illustrates replacement of p_prev at S370 to finalize the addition of node 400 to the node list according to some embodiments.

Figure 8:
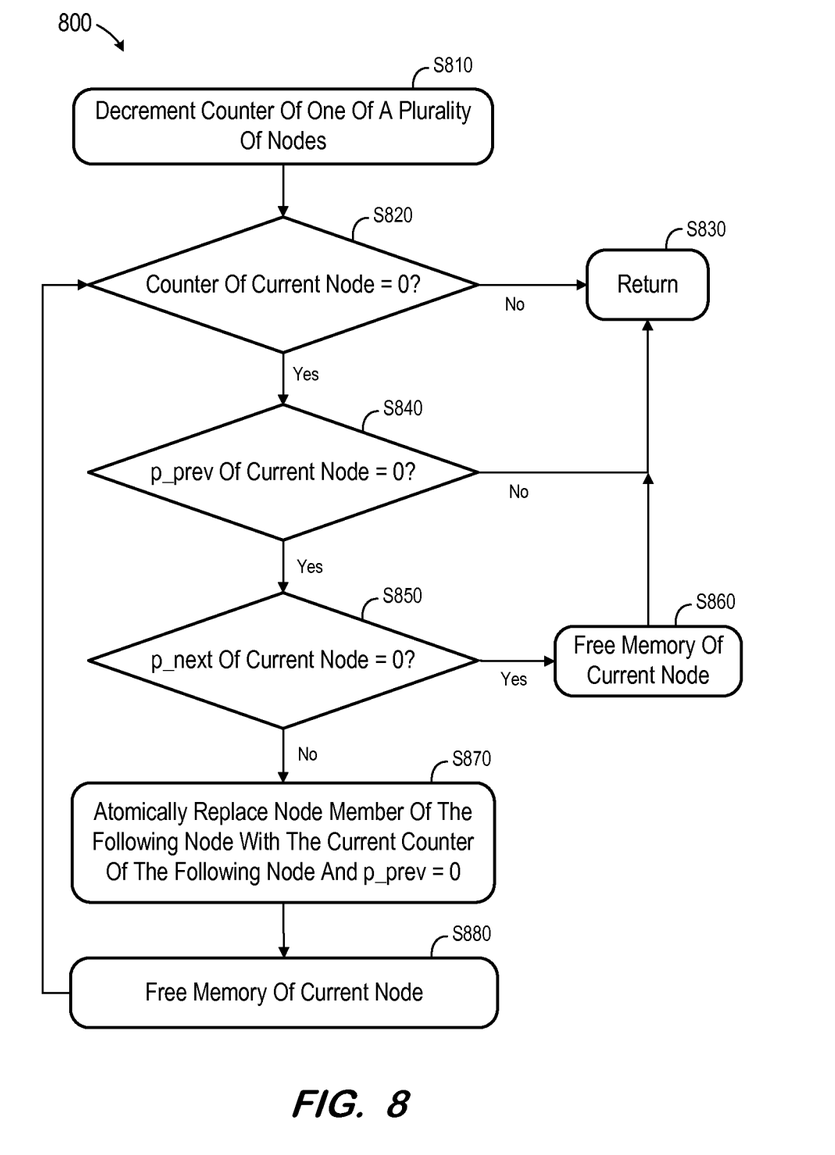
FIG. 8 is a flow diagram according to some embodiments.

FIG. 8 is a flow diagram of process 800 to respond to node destruction according to some embodiments. Destruction of a node is opposite of copying a node, and therefore corresponds to decrementing the node counter.

Figure 9:
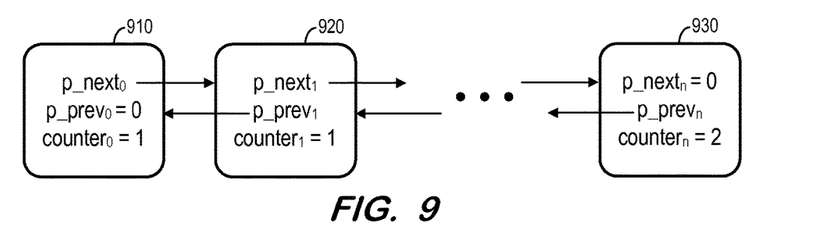
FIGS. 9-12 illustrate deletion of a node according to some embodiments.

Accordingly, at S810, a counter of a node is decremented. The counter may be decremented by atomically replacing the pointer_counter_combination node member with a decremented counter value and the current value of the p_prev pointer. FIGS. 9 through 12 illustrate a linked list for purposes of describing one implementation of process 800. It will be assumed that node 920 of FIG. 9 is decremented at S810, resulting in the linked list of FIG. 10.

Figure 10:
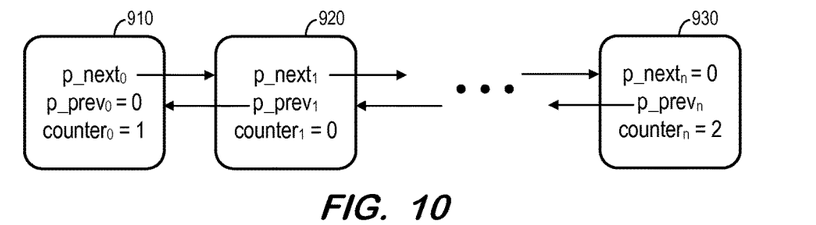

At S820, it is determined whether the counter of the current node=0. If not, flow returns at S830. According to the FIG. 10 example, the counter of node 920=0, therefore flow proceeds to S840. It is determined at S840 whether p_prev of the current node (e.g., node 920)=0. If not, flow again returns at S830. In the present example, p_prev of node 920 of FIG. 10 is not equal to zero, so flow returns via S830. Therefore, node 920 remains in the linked list in order to maintain the internal linkages of the list, but does not represent any actionable information (e.g., an unhandled exception).

Figure 11:
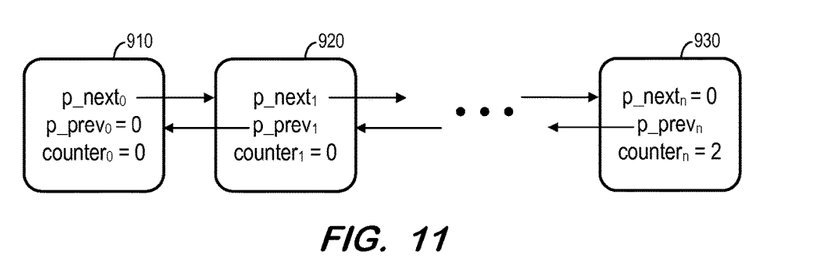
Figure 12:
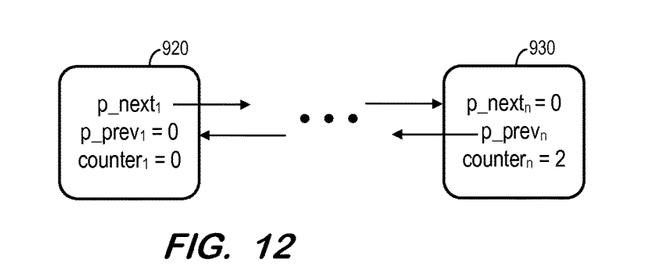

It will now be assumed that the counter of node 910 is decremented at S810, as shown in FIG. 11. Flow therefore proceeds through S820 to S840, where it is determined that the value of p_next of node 910 does not equal zero. Accordingly, flow proceeds to S870, where the pointer_counter_combination node member of the following node (i.e., node 920) is atomically replaced with its current counter and p_prev=0. Also, at S880, the memory of the current node (i.e., node 910) is freed. FIG. 12 illustrates the result of S870 and S880 according to some embodiments.

Flow then returns to S820, in which the prior "following" node (i.e., node 920) is now considered the "current" node.

Figure 13:
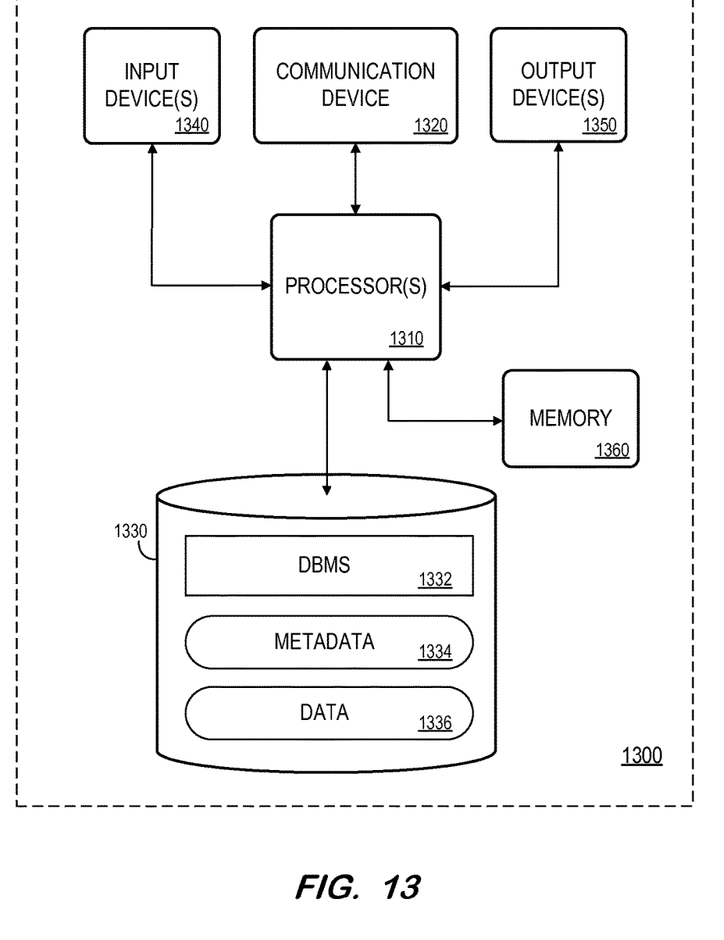
FIG. 13 is a block diagram of a computing apparatus according to some embodiments.

FIG. 13 is a block diagram of system 1300 according to some embodiments. System 1300 may comprise a general-purpose computing system and may execute program code to perform any of the processes described herein. System 1300 may comprise an implementation of database system 110 according to some embodiments. System 1300 may include other unshown elements according to some embodiments.

System 1300 includes processor(s) 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into system 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Database management system 1332 may comprise program code executed by processor 1310 to cause system 1300 to perform any one or more of the processes described herein. Embodiments are not limited to execution of these processes by a single apparatus. Metadata 133 and data 1336 may be alternatively implemented using volatile memory such as memory 1360. Data storage device 1330 may also store data and other program code for providing additional functionality and/or which are necessary for operation of system 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of a system according to some embodiments may include one or more processors to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
   a memory storing, in each of respective ones of a plurality of memory locations, a pointer to a next one of the plurality of memory locations, a pointer to a previous one of the plurality of memory locations, and a reference counter,
      storing, in a first memory location, a pointer to a next one of the plurality of memory locations and a respective reference counter, and
      storing, in a last memory location, a pointer to a previous one of the plurality of memory locations and a respective reference counter; and
   a processor to execute processor-executable program code to cause the computing system to:
   atomically increment a reference counter stored in one of the plurality of memory locations.

2. A computing system according to claim 1, wherein information associated with a respective programming exception object is stored in each of the respective ones of a plurality of memory locations.

3. A computing system according to claim 2, wherein the reference counter is atomically incremented in response to copying the programming exception object to a thread local storage.

4. A computing system according to claim 3, wherein, in each of the plurality of memory locations, the pointer to a previous one of the plurality of memory locations and the reference counter are represented by a value of a single variable, and wherein atomically incrementing of the reference counter comprises application of a compare-and-swap operation to the single variable of the one of the plurality of memory locations.

5. A computing system according to claim 3, the processor to execute processor-executable program code to cause the computing system to:

atomically decrement the reference counter stored in the one of the plurality of memory locations, in response to a determination that the respective programming exception is out of scope.

6. A computing system according to claim 3, wherein atomically incrementing of the reference counter comprises application of a compare-and-swap operation to the single variable.

7. A computing system according to claim 1, wherein, in each of the plurality of memory locations, the pointer to a previous one of the plurality of memory locations and the reference counter are represented by a value of a single variable.

8. A method executable by a computing device in response to execution of processor-executable program code, the method comprising:

storing, in a first memory location, a pointer to a next one of the plurality of memory locations and a respective reference counter, in each of respective ones of a plurality of memory locations, a pointer to a next one of the plurality of memory locations, a pointer to a previous one of the plurality of memory locations, and a reference counter, and in a last memory location, a pointer to a previous one of the plurality of memory locations and a respective reference counter; and atomically incrementing a reference counter stored in one of the plurality of memory locations, wherein, in each of the plurality of memory locations, the pointer to a previous one of the plurality of memory locations and the reference counter are represented by a value of a single variable, and wherein atomically incrementing the reference counter comprises applying a compare-and-swap operation to the single variable.

9. A method according to claim 8, wherein information associated with a respective programming exception object is stored in each of the respective ones of a plurality of memory locations.

10. A method according to claim 9, wherein the reference counter is atomically incremented in response to copying the programming exception object to a thread local storage.

11. A method according to claim 10, further comprising:
determining that the respective programming exception is out of scope; and
in response to determining that the programming exception is out of scope, atomically decrementing the reference counter stored in the one of the plurality of memory locations.

12. A non-transitory computer-readable medium storing program code, the program code executable by a computing system to cause the computing system to:

storing, in a first memory location, a pointer to a next one of the plurality of memory locations and a respective reference counter, in each of respective ones of a plurality of memory locations, a pointer to a next one of the plurality of memory locations, a pointer to a previous one of the plurality of memory locations, and a reference counter, and in a last memory location, a pointer to a previous one of the plurality of memory locations and a respective reference counter; and atomically incrementing a reference counter stored in one of the plurality of memory locations.

13. A non-transitory computer-readable medium according to claim 12, wherein information associated with a respective programming exception object is stored in each of the respective ones of a plurality of memory locations.

14. A non-transitory computer-readable medium according to claim 13, wherein the reference counter is atomically incremented in response to copying the programming exception object to a thread local storage.

15. A non-transitory computer-readable medium according to claim 14, wherein, in each of the plurality of memory locations, the pointer to a previous one of the plurality of memory locations and the reference counter are represented by a value of a single variable, and wherein atomically incrementing of the reference counter comprises application of a compare-and-swap operation to the single variable of the one of the plurality of memory locations.

16. A non-transitory computer-readable medium according to claim 14, the program code further executable by a computing system to cause the computing system to:

determine that the respective programming exception is out of scope; and in response to determining that the respective programming exception is out of scope, atomically decrement the reference counter stored in the one of the plurality of memory locations.

17. A non-transitory computer-readable medium according to claim 12, wherein, in each of the plurality of memory locations, the pointer to a previous one of the plurality of memory locations and the reference counter are represented by a value of a single variable.

18. A non-transitory computer-readable medium according to claim 17, wherein atomically incrementing of the reference counter comprises application of a compare-and-swap operation to the single variable.

* * * * *